(12) United States Patent
Molinari et al.

(10) Patent No.: US 11,893,730 B2
(45) Date of Patent: Feb. 6, 2024

(54) METHOD FOR AN AUTOMATIC SEGMENTATION AND CLASSIFICATION OF RELEVANT OBJECTS IN A DIGITAL TISSUE SAMPLE IMAGE

(71) Applicant: POLITECNICO DI TORINO, Turin (IT)

(72) Inventors: Filippo Molinari, Turin (IT); Massimo Salvi, Turin (IT)

(73) Assignee: Politecnico Di Tornio, Turin (IT)

( * ) Notice: Subject to any disclaimer, the term of this patent is extended or adjusted under 35 U.S.C. 154(b) by 603 days.

(21) Appl. No.: 17/059,823

(22) PCT Filed: Apr. 30, 2019

(86) PCT No.: PCT/IB2019/053533
§ 371 (c)(1),
(2) Date: Nov. 30, 2020

(87) PCT Pub. No.: WO2019/229556
PCT Pub. Date: Dec. 5, 2019

(65) Prior Publication Data
US 2021/0209751 A1  Jul. 8, 2021

(30) Foreign Application Priority Data
May 30, 2018 (IT) .......................... 102018000005848

(51) Int. Cl.
G06T 7/00 (2017.01)
G06T 7/11 (2017.01)
G06T 7/90 (2017.01)

(52) U.S. Cl.
CPC .............. *G06T 7/0012* (2013.01); *G06T 7/11* (2017.01); *G06T 7/90* (2017.01); *G06T 2207/30024* (2013.01)

(58) Field of Classification Search
CPC . G06T 7/0012; G06T 7/11; G06T 7/90; G06T 2207/30004; G06T 7/00
See application file for complete search history.

(56) References Cited

U.S. PATENT DOCUMENTS 9,971,931 B2 * 5/2018 Ajemba ................. G06T 7/45

FOREIGN PATENT DOCUMENTS

WO  2012016242 A2  2/2012
WO  2017191187 A2  11/2017

OTHER PUBLICATIONS

Osman M. K. et al., "Performance comparison of clustering and thresholding algorithms for tuberculosis bacilli segmentation", Computer, Information and Telecommunication Systems (CITS), 2012 International Conference On, IEEE, A14 May 2012 (May 14, 2012), pp. 1-5.

* cited by examiner

*Primary Examiner* — Tuan H Nguyen
(74) *Attorney, Agent, or Firm* — Thomas | Horstemeyer, LLP

(57) ABSTRACT

A Method comprising the steps of, acquiring an input about the target object class to be searched within the image; associating a set of morphological and chromatic parameters to a pre-set initialization value range selected from a library on the basis of the input; processing the tissue image on the basis of the selected parameters via a first segmentation (based on object based thresholding, morphological filtering, active contouring) algorithm to identify objects within the desired target object class; providing a result set comprising the objects complying with parameters within the pre-set initialization value range; checking whether a count of objects within the result set is below a predefined threshold and either entering an initial loop if the count is below the predefined threshold, or entering an adaptation branch.

11 Claims, 7 Drawing Sheets

Fig. 3
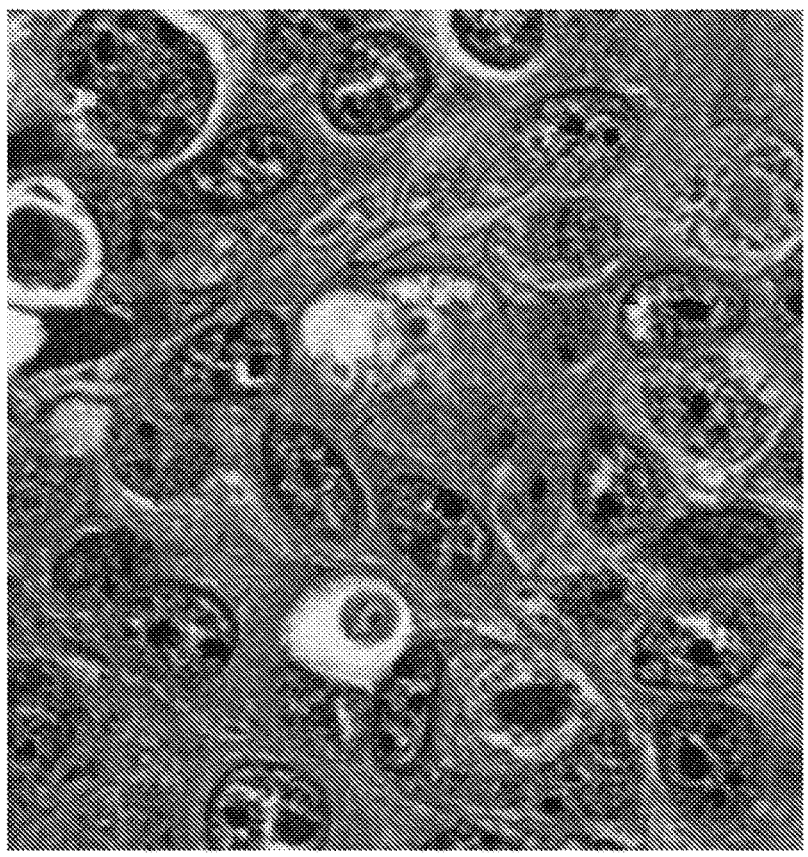
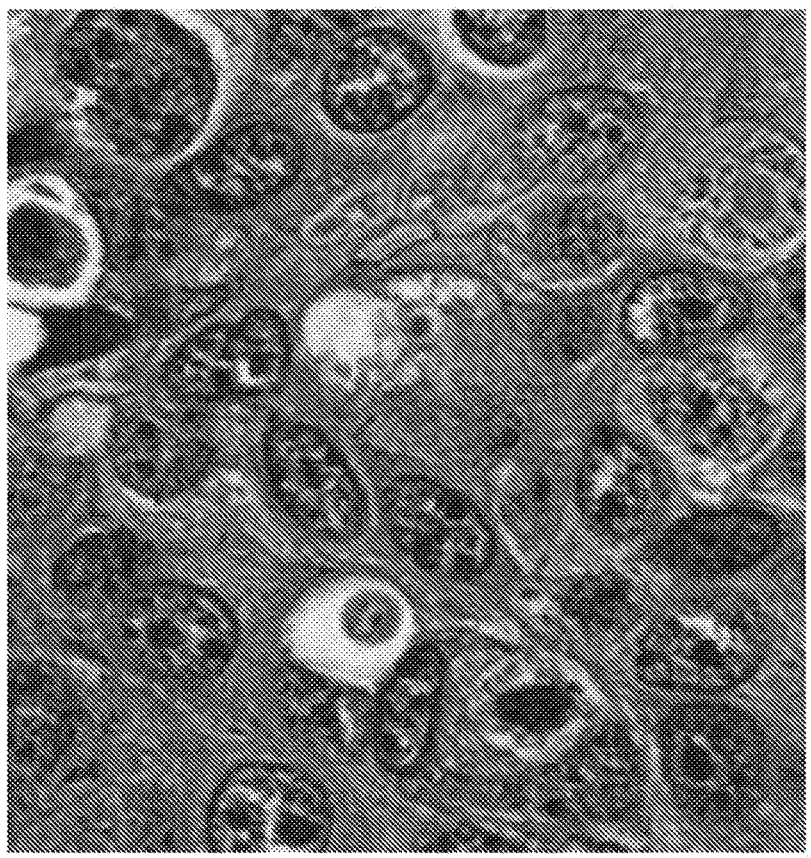

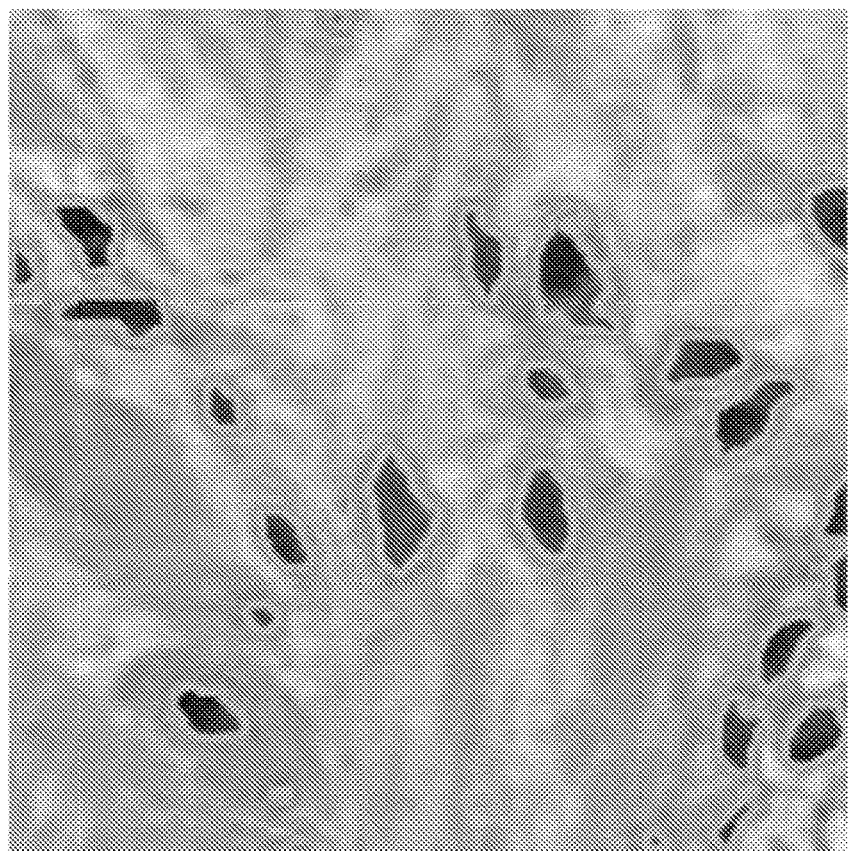
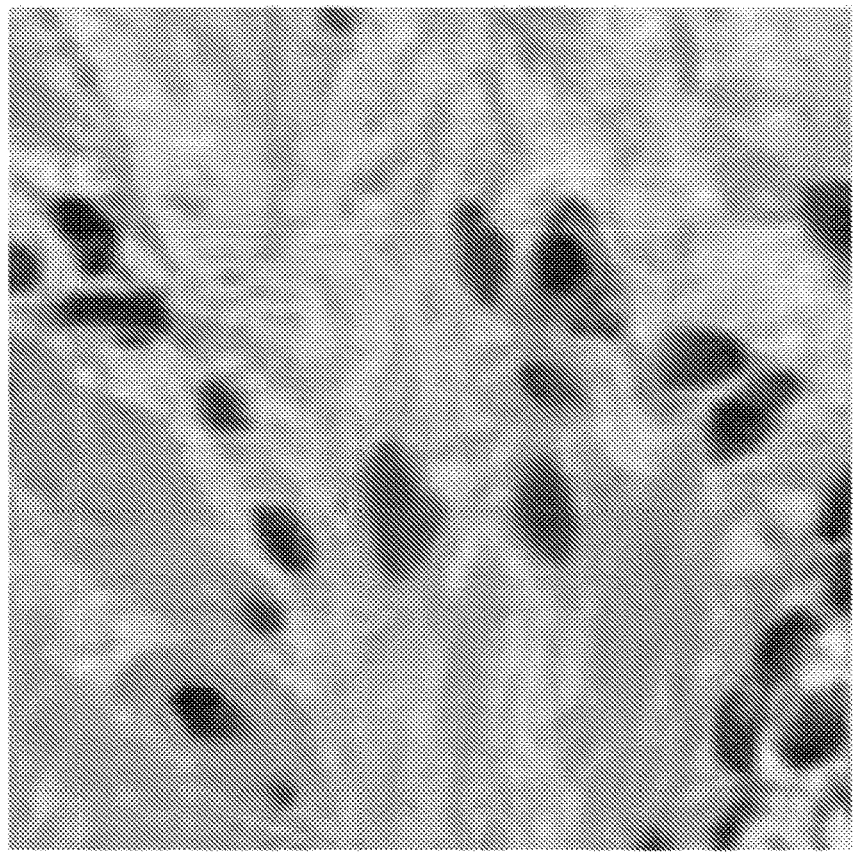
Fig. 4

Fig. 5
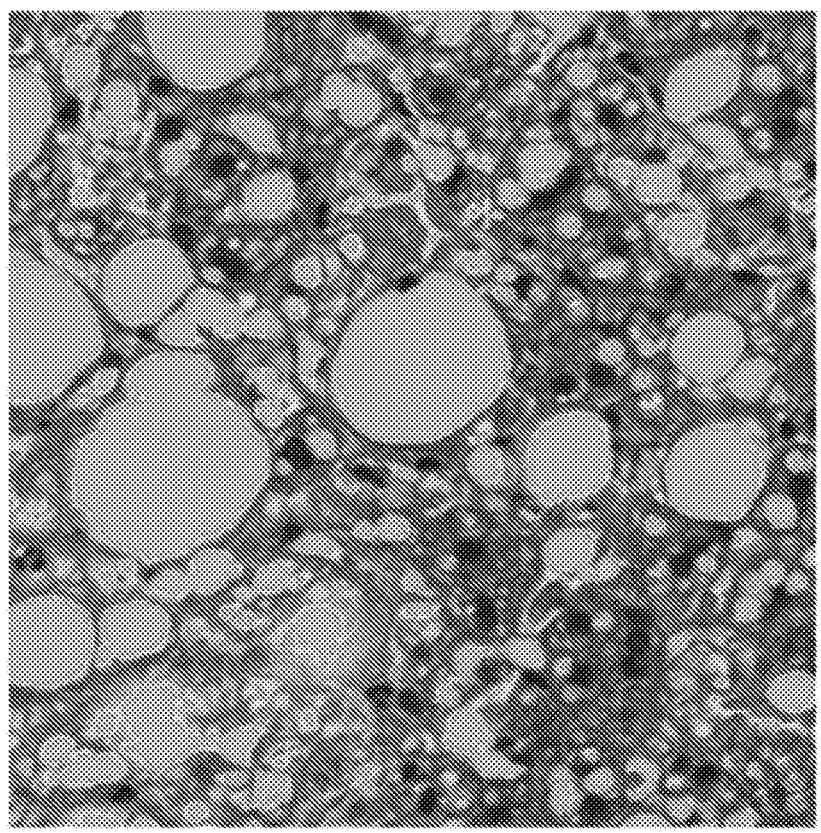
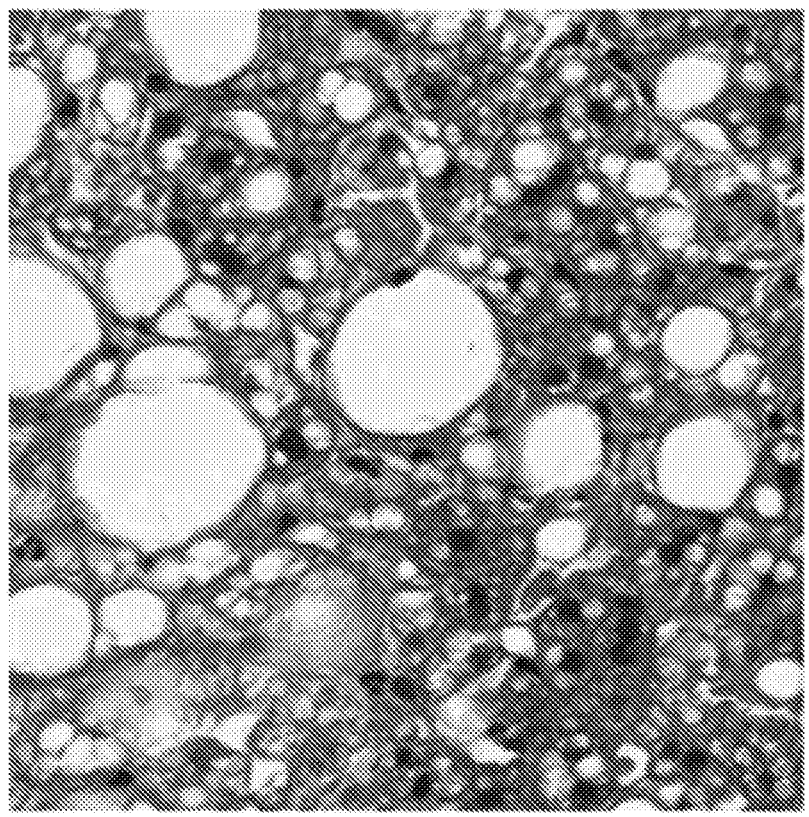

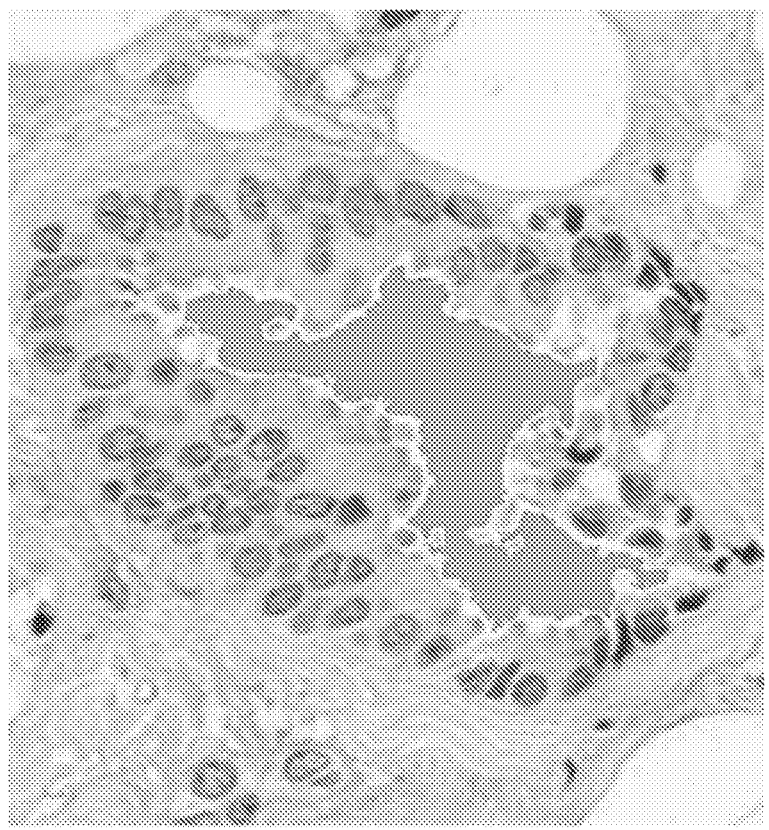
Fig. 6
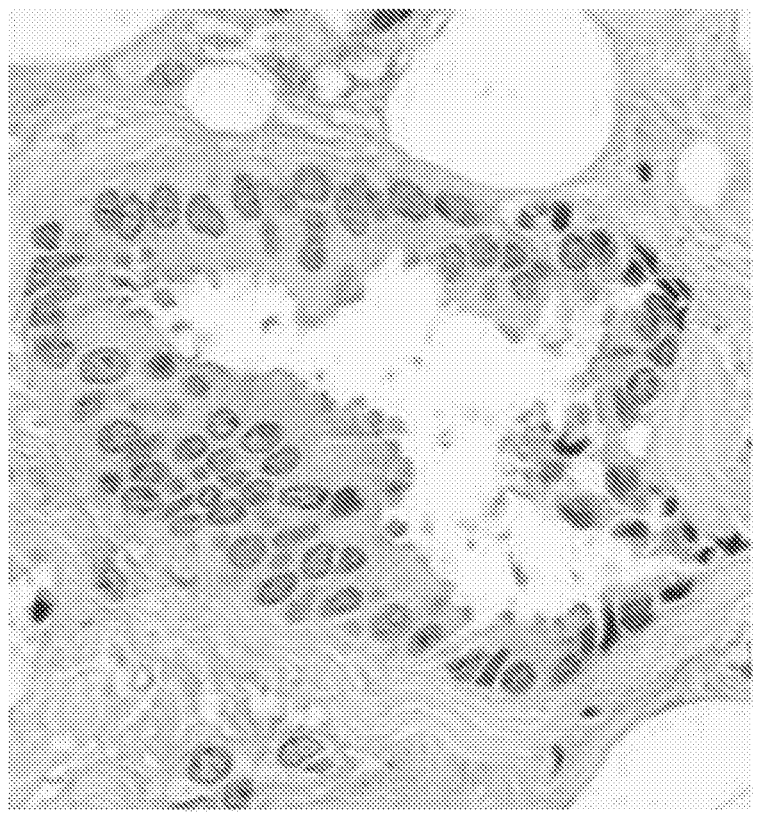

Fig. 7
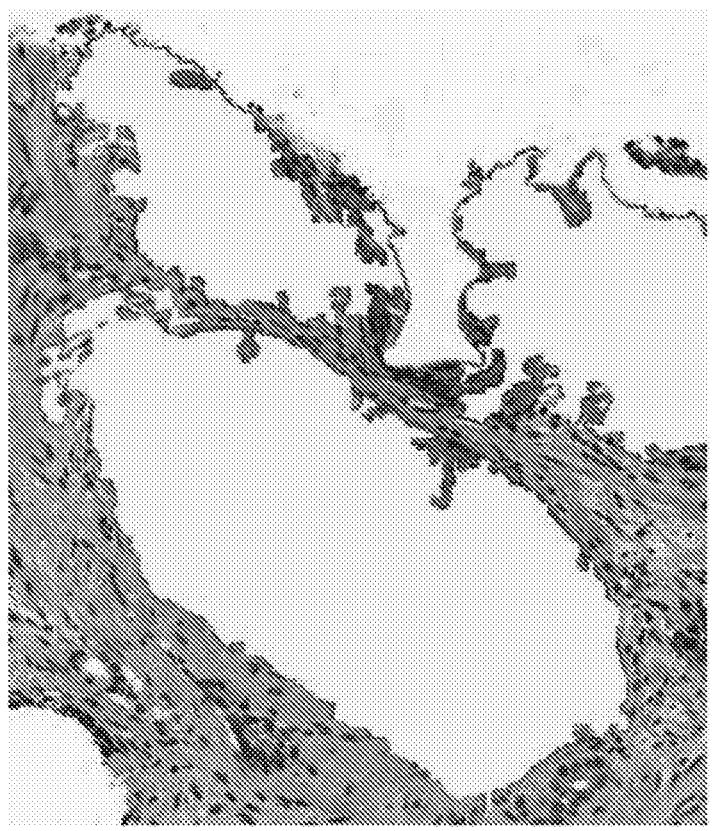
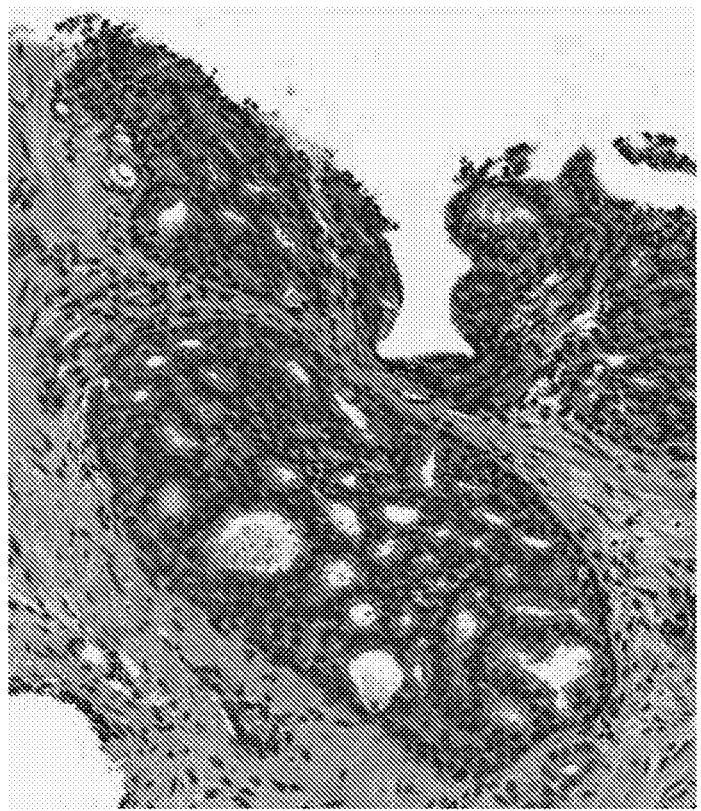

ND CLASSIFICATION OF
METHOD FOR AN AUTOMATIC SEGMENTATION AND CLASSIFICATION OF RELEVANT OBJECTS IN A DIGITAL TISSUE SAMPLE IMAGE

CROSS-REFERENCE TO RELATED APPLICATIONS

This application is the 35 U.S.C. § 371 national stage application of PCT Application No. PCT/IB2019/053533, filed Apr. 30, 2019, where the PCT claims priority to, and the benefit of, Italian application no. 102018000005848, filed May 30, 2018, both of which are herein incorporated by reference in their entireties.

TECHNICAL FIELD

The present invention refers to a method for an automatic segmentation and classification of relevant objects in a digital tissue sample image obtained e.g. via a biopsy.

STATE OF THE ART

National health care systems encourage an early diagnosis of a disease and this, combined with the advancements in medical testing of symptoms of a disease or of the disease itself, increases the number of medical test reports. Tissue image analysis is an important field of testing used for the diagnosis of several diseases.

An automatic processing of a tissue sample image has several advantages including the decrease of the overall time to provide a professional diagnosis by a pathologist and of errors due to a human factor when the tissue sample image is analysed. A pathologist receiving an automatically processed tissue sample image would focus on the treatment of the disease, if any, after a few days or hours after collection of the tissue sample to which the automatically processed image refers.

It is desirable that the automatic processing of a tissue sample image be scalable to a wide variety of object classes, e.g. from sub-cellular objects such as nuclei, membranes and the like, to cellular object classes such as lipids, to multi-cellular objects such as glands. As a matter of fact, due to the dimension and resolution of tissue sample images, it is possible to estimate, after a desired object class is selected, a minimum number of objects of interest within the tissue sample image, such minimum number being inversely proportional to the complexity of the object, i.e. the higher the complexity the lower the minimum number ranging, e.g. from one gland per image to a hundred of cell membranes per image.

It is further desirable that the automatic processing of a tissue sample image be adaptable to the specific kind of cellular structure within the specific tissue sample to be processed and/or to the scale of the image and/or to the specific staining used and/or other optical features of the image impacted either by the staining and/or by the optics used for the acquisition of the image.

SCOPES AND BRIEF DESCRIPTION OF THE INVENTION

The scope of the present invention is to provide a reliable automatic method to process a digital tissue sample image in order to provide data to help a diagnosis by a pathologist.

The scope of the present invention is achieved by a method according to claim 1, i.e. by the steps of:

Acquiring an input about the target object class to be searched within the image;

Associating a set of morphological and chromatic parameters to a pre-set initialization value range selected from a library on the basis of the input;

Processing the tissue image on the basis of the selected parameters via a first segmentation (based on object based thresholding, morphological filtering, active contouring) algorithm to identify objects within the desired target object class;

Providing a result set comprising the objects complying with parameters within the pre-set initialization value range;

Checking whether a count of objects within the result set is below a predefined threshold and
  either entering an initial loop if the count is below the predefined threshold, the initial loop comprising, for each iteration, the steps of providing an initial loop value range for at least one morphological and/or chromatic parameter, the initial loop value range being broader than the pre-set initialization value range or than an initial loop value range of the previous iteration, and the step of repeating said steps of processing, providing and checking;
  or entering an adaptation branch comprising the steps of:
    generating an adapted value range for said parameters based on the objects within the result set complying with the step of checking via a feature extraction algorithm, the adapted value range being broader than the initialization value range;
    processing the tissue image via a second segmentation algorithm to identify objects complying with the parameters within the adapted value range to provide an adaptation loop result set;
    applying a similarity test to the adaptation loop result set and a set comprising the result set complying with the step of checking.

The above method supports the provision of a very narrow initialization value range for each parameter so that, ideally, the first result set is a zero-error set, i.e. all objects in the first result set that pass the test at the checking step surely belong to the target object class indicated by the user. Therefore there is no false positive object within the zero-error set.

Preferably, pre-set initialization value ranges are e.g. statistically determined to be a single value for each parameter so as to provide one or more objects surely falling within the selected object class indicated by the user. However, in case of an excessively low number of objects at the end of the first iteration, pre-set initialization value ranges of parameters are automatically broadened in the initial loop until the pre-defined threshold provided in the step of checking is reached. Furthermore, also during the adaptation branch, the span of the value ranges of parameters is broadened with respect to the corresponding pre-set initialization value range.

If the initialization value range were excessively broad, wrong objects would be included in the first result set before or at the end of the initial loop, and such wrongly-classified objects would further propagate errors along the adaptation branch thus severely impacting precision of the classification.

According to an embodiment of the invention, the pre-set initialization value range of at least one morphologic and/or chromatic parameter is either a single figure or a narrow range of a predefined maximum value range that represents the maximum threshold of the incremental broadening executed for each iteration of the initial loop for the relevant morphologic and/or chromatic parameter. In particular, the narrow range depends on the target object class and the incremental step applied during broadening to calculate the initial loop value range at each iteration of the initial loop.

According to a preferred embodiment of the invention, the predefined threshold at the step of checking is selected from a library or look-up table on the basis of the target object class indicated by the user. In particular, the higher the complexity of the class the lower the threshold, e.g. threshold is 1 for a gland and is 100 for nucleoli etc. The predefined threshold also depends on the scale or magnification of the tissue sample image. According to a preferred embodiment, the method comprises a set-up step wherein the scale of the image is either inputted by the user or is automatically determined so that the relevant predefined threshold for the step of checking is automatically selected from the look-up table.

Furthermore, during the adaptation branch, an adapted value range of morphological and chromatic parameters is provided based on processing via an appropriate feature extraction algorithm of the result set complying with the step of checking. In particular, adapted value ranges have a first component calculated e.g. via a mean of values extracted by the extraction algorithm from each object in the result set that has passed the step of checking or via identification of a minimum and maximum value for each parameter among the outputs of the extraction algorithm value. For example, at the first iteration after the step of checking in case there is no iteration in the initial loop and the initialization value range has a single value for each parameter, such first component coincides with the initialization value range. A second component of the adapted value range is a broadening range applied to the first component. For example, the broadening range is a constant incremental step. The adapted value range provides a flexibility or 'adaptability' of the automatic method to the specific features of the tissue image due to optics of the image acquisition device and/or to the stain or the like used to prepare the tissue.

The adapted value range is used to apply a second segmentation algorithm to the tissue sample image, so as to find other objects of interest. Preferably, the second segmentation algorithm is applied to a different colorspace than that, e.g. RGB, of the image processed by the first segmentation algorithm. For example, such different colorspace is selected from one or more of grayscale and/or LAB colorspace and/or HSV and/or CMYK and/or YUV.

According to a preferred embodiment of the invention, there is no provision to check and/or decrease the threshold for an allowable count of the first result set and such threshold applied in the step of checking is and remains constant throughout each iteration of the method. This is of importance to avoid that subsequent steps are based on an excessively narrow data set.

According to a preferred embodiment, the adaptation branch is an adaptation loop and the initial loop is nested within the adaptation loop and comprises a step of evaluating whether the adapted value range of each parameter is comprised within a pre-defined maximum range; in a new iteration, the initial loop works with a new value range of the morphological and chromatic parameters that is the adapted value range from the adaptation loop of the previous iteration. The adaptation loop provides a number of iterations so that the tissue sample image is processed also with adapted value ranges and, ideally, all the objects falling within the target class are classified. The adaptation loop terminates when either the step of evaluating or the step of applying a similarity index provides a negative output.

According to a preferred embodiment, after the step of applying the similarity index, objects considered of interest are cancelled or otherwise become inactive to the action of the segmentation algorithm, i.e. the relative area is flagged as 'not-a-number', so that image processing during the following iteration is applied only to non-classified objects and, therefore, computational effort is saved.

The initial loop is therefore entered at the beginning of each adaptation loop in case the condition at the step of checking is not met. The pre-set initialization value range is used once, i.e. at the first iteration, of the method and is subsequently modified into either the initial loop value range or the adapted value range depending on the circumstances.

According to a preferred embodiment, morphologic parameters comprise one or more of eccentricity, axis ratio, solidity and circularity.

According to a preferred embodiment, eccentricity is the ratio of the distance between the foci of an ellipse that best fits the shape of the object of interest and a length of the relative major axis.

According to a preferred embodiment, the axis ratio is the ratio between the major and a minor axes of the above mentioned ellipse.

According to a preferred embodiment, the solidity is the ratio of an area of the object of interest and an area of the smallest convex polygon containing the object of interest.

According to a preferred embodiment, the circularity is the ratio between an area of the object of interest times 4 pi and a perimeter squared thereof.

According to a preferred embodiment, chromatic parameters comprise one or more of intensity and intensity variance.

Preferably, intensity is a mean luminous intensity of the object identified by the segmentation algorithm.

According to a preferred embodiment, the step of calculating the initial loop value range and the application of the second component to calculate the adapted value range is provided by broadening the value range of a parameter by a constant incremental step. Such incremental step may be applied symmetrically to the ends of the value range and, in case one of the ends reaches a respective maximum or minimum allowable value before the other end, incremental broadening is applied to the end that has not yet reached its maximum or minimum allowable value.

The second segmentation algorithm may be the same or different than the first segmentation algorithm.

BRIEF DESCRIPTION OF THE DRAWINGS

The invention is described in the following based on non-limiting examples shown for explanation purposes in the attached drawings, which respectively refer to:

FIGS. 3 to 7: a respective first picture (left) of a tissue and second picture (right) of the tissue after a segmentation algorithm has identified objects of a selected target object class.

DETAILED DESCRIPTION OF THE INVENTION

Figure 1:
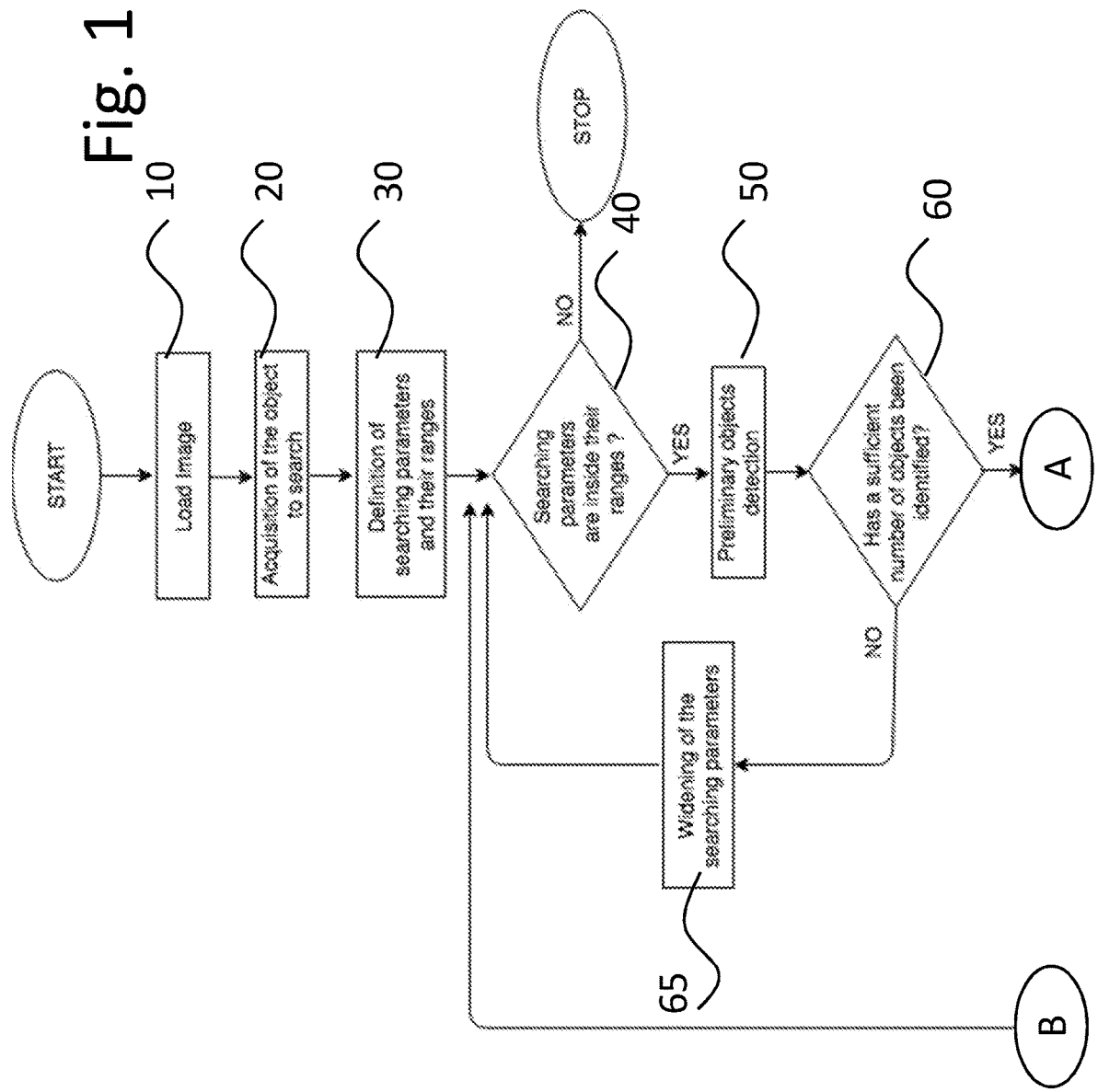
FIGS. 1 and 2: a flowchart of a preferred embodiment of a method according to the present invention.
Figure 2:
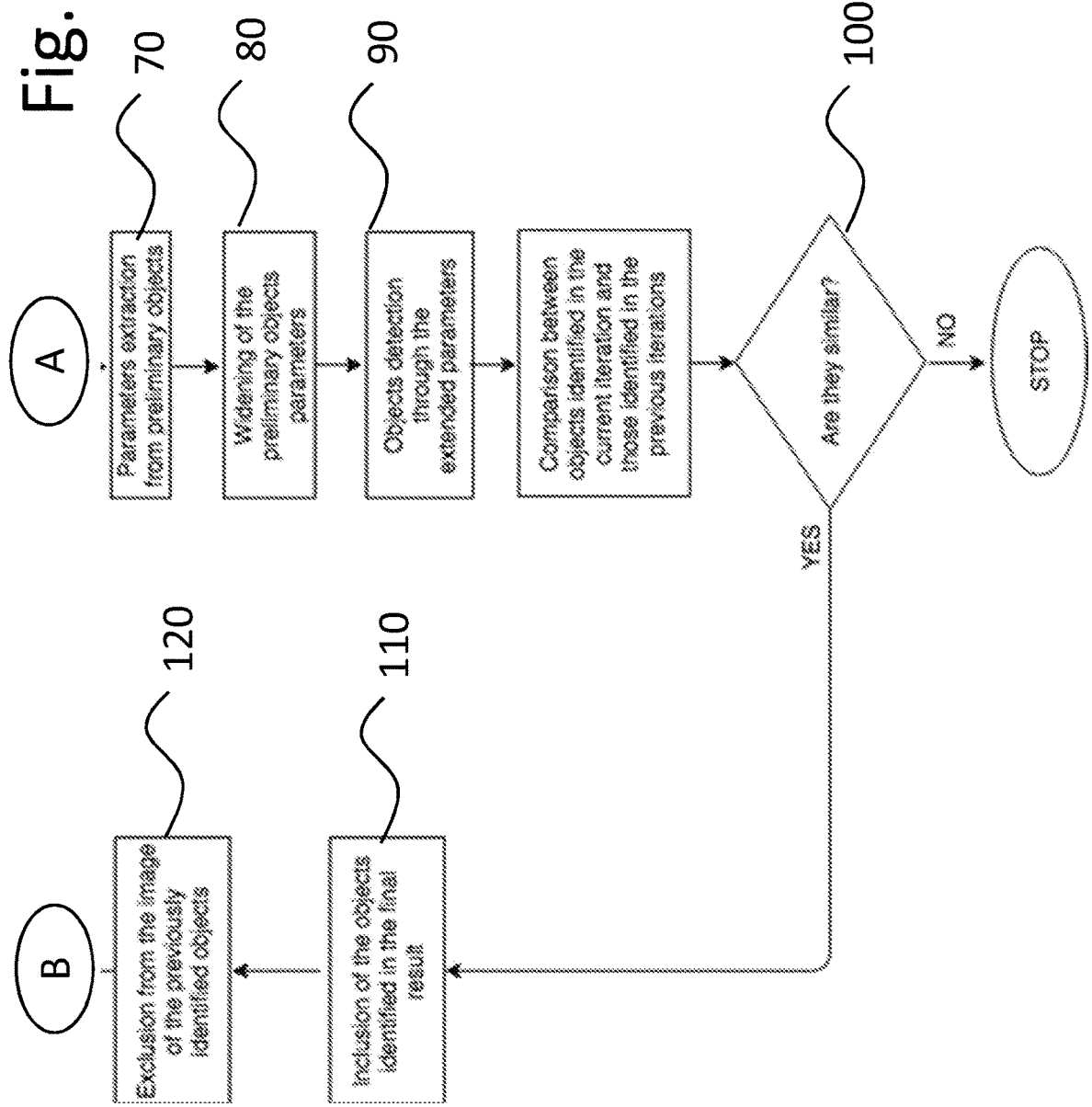

FIGS. 1 and 2 show, as a whole, a flowchart of a method according to a preferred embodiment of the invention carried out on a computer, which may be either a single device such as a personal computer or a computer unit having a client/server layout, programmed so that an initialization phase comprises the steps of loading 10 on a memory of the computer a digital tissue image acquired via known techniques such as a microscope slide scanner, introducing 20 e.g. by a user interface, an input about a target object class, e.g. membranes, nucleoli, nuclei, lipids, tubules, glands and the like; and matching 30 the input with a set of initialization value ranges for pre-defined morphological and/or chromatic parameters. In particular, the values of the initialization set, which includes a pre-defined initialization vector having a single value for each parameter, are comprised within a pre-defined allowable range stored in a library or look-up table. Preferably, the step of loading 10 the image comprises the step of automatically detecting a magnification, e.g. 10×, 20× or 40×. Otherwise, the step of introducing 20 includes the step of inputting the magnification of the sample image.

In case it is evaluated 40 that current value ranges are included within the span of the allowable range of the morphologic and/or chromatic parameters, the tissue image, preferably in the RGB colorspace, is processed 50 via a first segmentation algorithm based on the morphological and/or chromatic parameters having a value range.

An example of segmentation algorithm comprises morphological and/or chromatic filtering of the image based on parameters having value ranges selected from a library stored in the computer and selected based on the input introduced in step 20. In particular, an image operator of the computer executing the morphological and/or chromatic filtering of the image is adapted to provide locations of the objects belonging to the target object class based on shape characteristics and the relative value ranges active during filtering.

As an example of segmentation, the computer applies a threshold, for example an optical density threshold, to the tissue sample image to obtain first transformed image data. This first transformed image data is transformed by the application of a threshold in the sense that it is a two-state image of foreground (suprathreshold) and background (subthreshold) pixels, for example it may be binary data. Structures in this first transformed image data are then classified by comparing them with comparator data. In this embodiment, to classify the structures of interest (contiguous suprathreshold regions), the computer first identifies each contiguous group of suprathreshold pixels. This may be done by so called "blob extraction" methods such as connected component labelling. For example the computer may treat each suprathreshold pixel in turn, and for each such pixel identify the neighbours of that pixel which are also suprathreshold and identify (label) these as being part of the same contiguous group as that pixel. This process may be repeated iteratively until each contiguous group of pixels is labelled. These contiguous groups of pixels may each represent an object (or part of an object) in the underlying tissue from which the image data was obtained. Alternatively, the system can apply active contour modelling to find and classify objects of interest. Active contour model is a framework in computer vision for delineating one or more objects within an image in applications like shape recognition, segmentation and edge detection. Starting from a pixel, the model can expand or shrink itself, depending on the characteristics of the pixel neighbours. For any neighbour point, if its 8-connected neighbourhood contains at least a predefined number of points with similar characteristics to the neighbour point, the region is expanded to contain its neighbours, as well.

However, if the number of similar points in the neighbourhood is less than a threshold, the point is considered to be noise and it is deleted.

The system can also include a feature extraction algorithm. For example, to determine the size of the object, the computer may count the number of pixels which make up the object. To determine the shape of the object, the computer may use any one of a variety of different techniques, for example a template based matching method may be used, and/or the ratio of (1) the area of the object to (2) the square of the length of its boundary may be used to obtain information about the circularity of the object. Template based matching methods may comprise the computer applying a series of convolution kernels to the object, each having a different shape. In these cases, the shape of the object may be determined by identifying the convolution kernel which produces the output having the greatest total intensity. Other methods of identifying the shape of the object may be used.

Furthermore, an additional image filter may be configured to identify cell boundaries. Examples of image filters configured to identify cell boundaries include water-shedding algorithms. The output of this further image filter is cell boundary data identifying the locations of cell boundaries. The computer can then use the locations of the cell boundaries in the sample tissue image to determine the length of these cell boundaries, and the size of the areas they enclose, amongst other cellular characteristics such as its shape factor.

According to a preferred embodiment, segmentation is based on parameters such as the above defined eccentricity ECC, axis ratio AXR, solidity SOL and circularity CIR as morphological parameters and the above defined intensity INT and intensity variance VAR as chromatic parameters.

Preferably, parameters and the relative value ranges are grouped in matrices, wherein the computer stores a lower and an upper value for each parameter until a pre-defined maximum and minimum value for each parameter is reached. An example of a structure for such a matrix is shown below:

$$\begin{bmatrix} ECC_{min} & AXR_{min} & SOL_{min} & CIR_{min} & INT_{min} & VAR_{min} \\ ECC_{max} & AXR_{max} & SOL_{max} & CIR_{max} & INT_{max} & VAR_{max} \end{bmatrix}$$

As mentioned above, according to an embodiment, the initial value range for one or more of the parameters is a single value.

For example, a maximum value range activated in step 30 for target object class nucleoli is:

$$\begin{bmatrix} 0.00 & 0.80 & 0.65 & 0.75 & 0.00 & 0.00 \\ 0.35 & 1.00 & 1.00 & 1.00 & 0.40 & 0.20 \end{bmatrix}$$

And respective initialization single values are:
ECC=0.05, AXR=1.00, SOL=0.90, CIR=1.00, INT=0.10, VAR=0.10

Furthermore, a maximum value range activated in step 30 for target object class nuclei is:

$$\begin{bmatrix} 0.00 & 0.60 & 0.70 & 0.55 & 0.00 & 0.00 \\ 0.40 & 1.00 & 1.00 & 1.00 & 0.45 & 0.55 \end{bmatrix}$$

And respective initialization single values are:
ECC=0.15, AXR=1.00, SOL=1.00, CIR=0.85, INT=0.15, VAR=0.10

Furthermore, a maximum value range activated in step 30 for target object class membranes is:

$$\begin{bmatrix} 0.00 & 0.30 & 0.30 & 0.25 & 0.00 & 0.05 \\ 0.65 & 0.90 & 0.80 & 0.95 & 0.70 & 0.45 \end{bmatrix}$$

And respective initialization single values are:
ECC=0.20, AXR=0.50, SOL=0.55, CIR=0.80, INT=0.20, VAR=0.15

Furthermore, a maximum value range activated in step 30 for target object class lipids is:

$$\begin{bmatrix} 0.00 & 0.75 & 0.85 & 0.85 & 0.55 & 0.00 \\ 0.20 & 1.00 & 0.95 & 1.00 & 1.00 & 0.15 \end{bmatrix}$$

And respective initialization single values are:
ECC=0.00, AXR=0.90, SOL=0.90, CIR=1.00, INT=0.95, VAR=0.05

Furthermore, a maximum value range activated in step 30 for target object class tubuli is:

$$\begin{bmatrix} 0.15 & 0.25 & 0.40 & 0.40 & 0.65 & 0.00 \\ 0.80 & 1.00 & 1.00 & 0.85 & 1.00 & 0.20 \end{bmatrix}$$

And respective initialization single values are:
ECC=0.50, AXR=1.00, SOL=0.85, CIR=0.65, INT=1.00, VAR=0.05

Furthermore, a maximum value range activated in step 30 for target object class glands is:

$$\begin{bmatrix} 0.00 & 0.55 & 0.65 & 0.35 & 0.10 & 0.15 \\ 0.70 & 0.85 & 0.95 & 0.90 & 0.80 & 0.65 \end{bmatrix}$$

And the respective initialization single values are:
ECC=0.25, AXR=0.70, SOL=0.85, CIR=0.80, INT=0.65, VAR=0.40 According to the present invention, it is possible to set further maximum value ranges and initialization value ranges, comprising a single initialization value, for other sub-cellular, cellular or multi-cellular target objects such as vessels and fibres.

After the initialization value range is applied to obtain a result set, if it is checked 60 that a count of such result set is lower than a pre-defined minimum threshold, in particular lower than a pre-set minimum threshold based on the input at step 20 and retrieved by the computer within a stored library or look-up table, the method enters an initial loop wherein, for each iteration, the initialization value range is broadened 65, e.g. by an incremental step of +/−0.005, and steps 40 to 60 are repeated.

According to a preferred embodiment, the pre-defined minimum threshold is selected from a library or look-up table on the basis of the magnification factor of the sample image. In particular, the following values of pre-defined minimum threshold are applicable (between brackets the magnification factor):

Nucleoles: 100 (10×), 40 (20×), 10 (40×);
Nuclei: 50 (10×), 20 (20×), 5 (40×)
Membranes: 5 (10×), 2 (20×), 1 (40×)
Lipids: 30 (10×), 10 (20×), 5 (40×)
Tubuli: 10 (10×), 5 (20×), 1 (40×)
Glands: 5 (10×), 2 (20×), 1 (40×)

According to a preferred embodiment, the value range for each iteration of the initial loop is broadened by a constant step of e.g. +/−0.005, i.e. about 1% of the maximum value. For example, in the case of nucleoli, the broadening from the single value of eccentricity after the first iteration of the initial loop is the range 0.045-0.055. Such range may also be an example of an initialization value range. When the lower endpoint becomes 0, i.e. the minimum allowable value, and further iterations are needed, the constant step is applied only to the other endpoint, which is below the maximum allowable value of 0.80.

Preferably, the constant step is narrow so that broadening is fine and the pre-defined threshold is reached with a very low probability that an allowable set of results includes one or more errors, i.e. objects not belonging to the target object class selected by the user in step 20.

Where the pre-defined threshold in the step of checking 60 is reached, i.e. it is likely that the result set comprises objects having a minimum probability of being wrongly classified, an initial result set is elaborated by the computer in an adaptation branch of the present method.

In particular, such result set is elaborated in order to extract an adapted value range for the parameters aiming at taking into consideration specific features originated by the acquisition optics or the stain of the current tissue sample image.

Preferably, an adapted value range is obtained by the combination of a first component obtained after processing 70 via a feature extraction algorithm of the objects within the result set. At the very first iteration, if the step of checking 60 is immediately satisfied without broadening the single value initialization set, the first component is identical to the initialization value range, i.e. [0.05 1.00 0.90 1.00 0.10 0.10] for nucleoli, because the feature extraction is operated in the same manner for step 50 and step 70, e.g. feature extraction is comprised in the segmentation. In general, the first component comprises a lower and an upper value, i.e. a range, for each parameter determined from a minimum and a maximum value for each parameter selected among the outputs of feature extraction algorithm applied to the objects within the result set. A second component of the adapted value range is a broadening 80, e.g. via a constant incremental step such as +/−0.005, i.e. approx. 1% of the maximum value, applied to the first component, preferably symmetrically applied. Therefore the span of the adapted value range is always greater than the span of the initialization value range.

After the adapted value range is determined, the sample tissue image is processing 90 based on morphologic and/or chromatic parameters having the adapted value range. Preferably, this is performed according to a second segmentation algorithm, preferably identical to the first segmentation algorithm, which is applied to the sample image in one or more additional colorspaces to the RGB colorospace, such as LAB colorspace, grayscale colorspace, HSV colorspace. This improves the identification of potential objects of interest without a severe impact on the precision of the classification.

According to an option, the result set that passed the step of checking 60 is excluded from the image before the step of processing 90 so that the latter applies only to unclassified pixels or objects.

When objects meeting the adapted value ranges of the relevant iteration are identified, the computer checks 100 whether such objects are similar to those already classified according to the inputs of step 20 in the previous iterations. Examples of a similarity algorithm is based on any combination of the Jaccard similarity index, Dice coefficient and mean relative error for each morphologic or chromatic parameter between values of the current iteration and the group of all classified objects from the current and the previous iterations.

If there is no similarity, the method is stopped.

If there is similarity, the objects are included 110 in the set of the final results, i.e. the group of classified objects; such objects are cancelled 120 from the sample tissue image so as to be excluded from processing during the following iterations. In particular, this is performed by e.g. tagging the relevant pixels of the sample image as 'not-a-number'.

According to a preferred embodiment, the adaptation branch, i.e. steps from 70 to 100, defines an adaptation loop including steps 110, 120 and the initial loop, i.e. steps 40 to 60. In a following iteration, the adaptation loop provides the step of evaluating 40 with the adapted value range having the first component of step 70 and the second component of step 80 as a starting value range for to be applied to the sample image.

It will be appreciated in the context of the present disclosure that the image data referred to herein may originate from any one of a plurality of different classes of imaging system. These systems may each use different image acquisition protocols, and different types of optics. For example, some systems acquire a series of monochrome images each using a different one of a series of different colour filters. The resulting monochrome images can then be combined to provide a colour image if a sample in discrete, well-defined colour bands. Other systems use colour cameras in combination with multi-band filters. Such filters may have for example three predefined colour pass-bands so as to generate colour images in a single shot. The pass bands may be selected based on the characteristics of the sample or analysis technique. Some examples of whole-slide imaging systems include the Aperio C52, AT2, LV1 (available from Aperio, Vista, Calif.), the Leica SCN400F (available from Leica Biosystems, Richmond, Ill.). The 3DHistech P250 (available from SDHistech, Budapest, Hungary) is an example of this kind of scanner. Other examples of whole-slide imaging systems include the Olympus VS 20 (available from Olympus Corporation, Tokyo, Japan), and the Philips UFS System (available from Philips Digital Pathology Solutions, Best, The Netherlands). Yet further systems exist and no doubt will be developed in the future—embodiments of the invention may permit the processing of, and comparison between, image data originating from any one or more of such systems.

Furthermore, in some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The activities and apparatus outlined herein may be implemented with fixed logic such as assemblies of logic gates or programmable logic such as software and/or computer program instructions executed by a processor. Other kinds of programmable logic include programmable processors and graphics processing units, programmable digital logic (e.g., a field programmable gate array (FPGA), an erasable programmable read only memory (EPROM), an electrically erasable programmable read only memory (EEPRO)), an application specific integrated circuit, ASIC, or any other kind of digital logic, software code, electronic instructions, flash memory, optical disks, CD-ROMs, DVD ROMs, magnetic or optical cards, other types of machine-readable mediums suitable for storing electronic instructions, or any suitable combination thereof.

In some examples the functionality of the computer and/or the processor may be provided by digital logic, such as field programmable gate arrays, FPGA, application specific integrated circuits, ASIC, a digital signal processor, DSP, or by software loaded into a programmable processor. The functionality of the processor and its programs may be provided in a single integrated unit, or it may be distributed between a number of processors, which may be arranged to communicate over a network, such as "cloud" computing. This may enable, for example, the processing steps of the method to be performed at a device (or devices) that are remote from the image capture and the image analysis. In the context of the present disclosure other examples and variations of the devices and methods described herein will be apparent to a person of skill in the art. Other examples and variations are within the scope of the disclosure, as set out in the appended claims.

The invention claimed is:

1. Method for processing a digital tissue sample image comprising:
    Acquiring an input about a target object class to be searched within a image;
    Associating a set of morphological and chromatic parameters to a pre-set initialization value range selected from a library on the basis of the input;
    Processing a tissue image on the basis of a set of selected parameters via a first segmentation algorithm to identify objects within a desired target object class;
    Providing a result set comprising the objects complying with parameters within a pre-set initialization value range;
    Checking whether a count of objects within the result set is below a predefined threshold and
    either entering an initial loop if the count is below the predefined threshold, the initial loop comprising, for each iteration, the steps of providing an initial loop value range for at least one morphological and/or chromatic parameter, the initial loop value range being broader than the pre-set initialization value range or than the initial loop value range of the previous iteration, and the step of repeating said steps of processing, providing and checking;
    or entering an adaptation branch comprising:
    generating an adapted value range for said parameters based on the objects within the result set complying with the step of checking via a feature extraction algorithm, the adapted value range being broader than the initialization value range;
    processing the tissue image via a second segmentation algorithm to identify objects complying with the parameters within the adapted value range to provide an adaptation loop result set;
    applying a similarity test to the adaptation loop result set and a set comprising the result set complying with the step of checking.

2. Method according to claim 1, wherein the predefined threshold at the step of checking is selected from a library or look-up table on the basis of the target object class inputted by the user in the step of acquiring.

3. Method according to claim 1, wherein the adapted value range comprises a first component defined by an output of the feature extraction algorithm applied to the result set from the step of checking and a second component comprising an incremental step applied to the first component.

4. Method according to claim 1, wherein the first step of processing and the second step of processing are applied to different colorspaces of the sample image.

5. Method according to claim 1, wherein the threshold at the step of checking is constant for a given magnification factor of the sample image.

6. Method according to claim 1, wherein the adaptation branch is an adaptation loop and the initial loop is nested within the adaptation loop and comprises a step of evaluating whether a new value range of each parameter is comprised within a pre-defined allowable range and wherein the new value range is based on the adapted value range from the previous iteration of the adaptation loop.

7. Method according to claim 1, wherein after the step of applying the similarity index, objects considered similar are tagged in the sample image as inactive to the action of the segmentation algorithms.

8. Method according to claim 1, wherein morphologic parameters comprise one or more of eccentricity (ECC), axis ratio (AXR), solidity (SOL) and circularity (CIR).

9. Method according to claim 1, wherein chromatic parameters comprise one or more of intensity (INT) and intensity variance (VAR).

10. Method according to claim 1, wherein the allowable value range for nucleoli is:

$$\begin{bmatrix} 0.00 & 0.80 & 0.65 & 0.75 & 0.00 & 0.00 \\ 0.35 & 1.00 & 1.00 & 1.00 & 0.40 & 0.20 \end{bmatrix}$$

Wherein:

$$\begin{bmatrix} ECC_{min} & AXR_{min} & SOL_{min} & CIR_{min} & INT_{min} & VAR_{min} \\ ECC_{max} & AXR_{max} & SOL_{max} & CIR_{max} & INT_{max} & VAR_{max} \end{bmatrix}.$$

11. Method according to claim 1, wherein the initialization value range for nucleoli is:

$$\begin{bmatrix} 0.045 & 0.99 & 0.895 & 0.99 & 0.095 & 0.095 \\ 0.055 & 1.00 & 0.905 & 1.00 & 0.105 & 0.105 \end{bmatrix}$$

Wherein:

$$\begin{bmatrix} ECC_{min} & AXR_{min} & SOL_{min} & CIR_{min} & INT_{min} & VAR_{min} \\ ECC_{max} & AXR_{max} & SOL_{max} & CIR_{max} & INT_{max} & VAR_{max} \end{bmatrix}.$$

* * * * *